Patented July 28, 1931

1,816,131

UNITED STATES PATENT OFFICE

FRANK E. SPENCER, OF LYNCHBURG, MISSOURI

PLANTER ATTACHMENT

Application filed January 26, 1931. Serial No. 511,411.

This invention relates to planters, and aims to provide an attachment which may be readily and easily secured to the usual corn planter, for opening a furrow directly in front of the grain shoe of the planter, thereby reducing the planting and forming of the furrow, to a single operation.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings.

Figure 1:
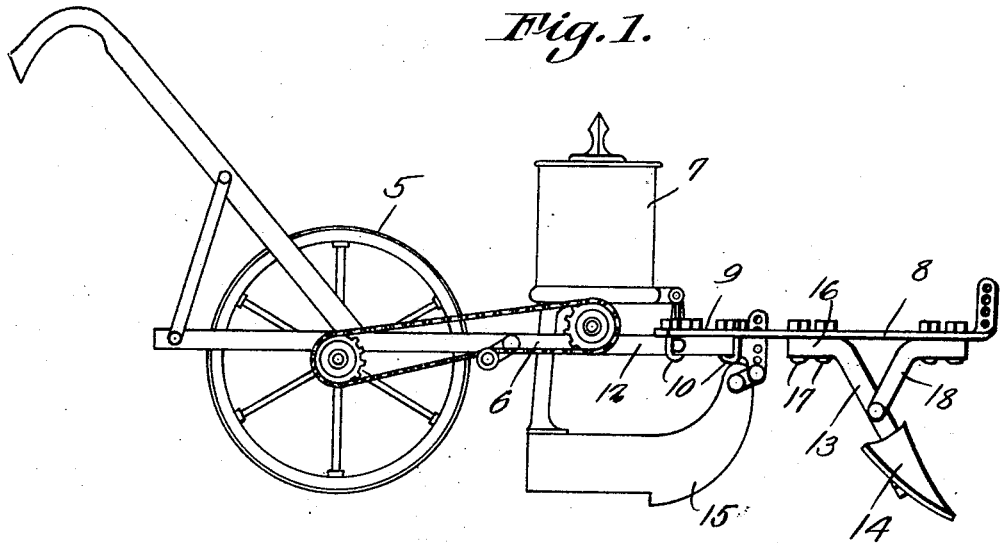
Figure 1 is a side elevational view of a planter equipped with an attachment constructed in accordance with the invention.

Referring to the drawings in detail, a one horse corn planter is shown and indicated generally by the reference character 5, the planter embodying the usual frame 6 and seed box 7.

The attachment, forming the essence of this invention, includes a beam 8 that is of substantially Y formation, so that the extensions 9, forming a part of the beam, may be secured to the planter frame, in such a way as to insure against the beam twisting or moving, with respect to the frame.

Figure 2:
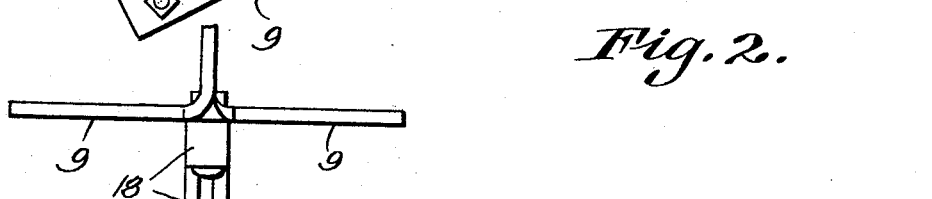
Figure 2 is an enlarged plan view of the attachment.
Figure 3:
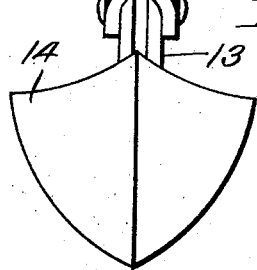
Figure 3 is a front elevational view of the planter attachment.

U bolts 10 are extended through the extensions 9, and embrace portions of the frame of the planter, as clearly shown by Figure 2 of the drawings. These U bolts are arranged in pairs, so that the forward U bolts may connect with the front bar 11 of the frame of the planter, while the rear bolts connect with the side bars 12 of the planter frame, preventing twisting of the beam 8.

The reference character 13 designates the shovel plow beam on which the shovel plow 14 is mounted, the construction of the beam 8 and shovel plow 14, being such that the plow 14 will operate directly in front of the shoe 15 of the planter, providing a furrow to permit the seed to be deposited directly therein. The upper end of the shovel plow beam 13, extends rearwardly as at 16, where it is bolted to the beam 8 by means of the bolts 17.

The reference character 18 designates an arm that is secured to the beam 8, near the front end thereof, the arm 18 being connected with the shovel plow beam 13, at a point near the upper end of the plow, to brace the plow against rearward movement.

From the foregoing it will be obvious that due to the construction shown and described, the beam 8 may be readily secured to the usual planter frame, in such a way as to rigidly secure the beam in position, and that the shovel plow 14 supported by the beam, will form a furrow directly in front of the grain shoe of the planter, to permit the planting of grain by a single operation, and eliminating the necessity of first forming the furrow, and then planting the seeds in the furrow.

I claim:

1. An attachment for planters, comprising a beam having lateral extensions adapted to rest on the front and side bars of a planter frame, U bolts passing through the beam and embracing the front and side bars of the planter frame, and a shovel plow mounted on the beam.

2. An attachment for planters, comprising a Y beam, means for removably attaching the Y beam to the frame of a planter, a shovel plow beam secured to the Y beam and extending downwardly therefrom, said shovel plow beam being disposed near the front end of the Y beam, and an arm connected with the shovel plow beam and Y beam.

3. An attachment for planters, comprising a beam having lateral extensions, said lateral extensions adapted to rest on the frame of a planter, and extend across the corners of the planter, means for removably securing the beam in position on the frame, a shovel plow beam secured to the first mentioned beam, and a shovel plow on the shovel plow beam.

In testimony that I claim the foregoing as my own, I have hereto affixed my signature.

FRANK E. SPENCER.